US008422656B2

(12) United States Patent
Pearson et al.

(10) Patent No.: US 8,422,656 B2
(45) Date of Patent: *Apr. 16, 2013

(54) INCOMING AND OUTGOING CALL CONTROL CUSTOMIZATION

(75) Inventors: Larry B. Pearson, San Antonio, TX (US); Jeffrey L. Brandt, Cedar Park, TX (US); James T. Miller, Austin, TX (US); James M. Doherty, Georgetown, TX (US); Stephen M. Mueller, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,535

(22) Filed: Sep. 14, 2012

(65) Prior Publication Data

US 2013/0010944 A1  Jan. 10, 2013

Related U.S. Application Data

(63) Continuation of application No. 11/282,662, filed on Nov. 21, 2005, now Pat. No. 8,306,209.

(51) Int. Cl.
*H04M 7/00* (2006.01)

(52) U.S. Cl.
USPC .............. 379/220.01; 379/211.02; 379/212.01

(58) Field of Classification Search ............... 379/88.01, 379/211.02, 212.01, 219, 220.01, 265.01, 379/265.02, 265.05, 299.01
See application file for complete search history.

(56) References Cited

U.S. PATENT DOCUMENTS

| 5,946,386 | A | 8/1999 | Rogers et al. |
|---|---|---|---|
| 6,529,596 | B1 | 3/2003 | Asprey et al. |
| 6,542,601 | B1 | 4/2003 | Hernandez et al. |
| 7,127,400 | B2 | 10/2006 | Koch |
| 2003/0128691 | A1 | 7/2003 | Bergman et al. |
| 2004/0161079 | A1 | 8/2004 | Virzi et al. |
| 2006/0210024 | A1 | 9/2006 | Qiu |

OTHER PUBLICATIONS

Tyson et al., "How VoIP works," How Stuff Works, retrieved from the Internet, < URL: http://www.howstuffworks.com/ip-telephony.htm >, Oct. 25, 2005.
This NPL can be found in the parent case U.S. Appl. No. 11/282,662, and the publication date of the NPL is Oct. 25, 2005.

*Primary Examiner* — Ahmad F. Matar
*Assistant Examiner* — Oleg Asanbayev
(74) *Attorney, Agent, or Firm* — Greenblum & Bernstein, P.L.C.

(57) ABSTRACT

Customer communications can be controlled in accordance with customized rules. An entry menu includes options to modify an existing rule or create a new rule for controlling customer communications. An initial selection criteria menu includes options to indicate whether the new customized rule will be built using a preexisting template or starting from initial blank rule criteria. A list of preexisting templates for creating new customized rules can be provided, and input to populate a selected template can be accepted. Initial blank rule criteria for creating new customized rules can also be provided, including initial criteria and rule conditions for selected initial criteria. Communications are processed in accordance with the stored new customized rule.

17 Claims, 16 Drawing Sheets

Generic Telephone System           Welcome Larry | Log Out

Help For This Page

900

Blank Rules - Inbound Calls

Apply this rule...

Before the phone can ring
After the phone can ring

—950

Rule Description (Click on an underlined value to edit it):

Apply this rule on inbound calls.          —830

| Cancel | Back | Next | Finish |
|---|---|---|---|
| 740 | 741 | 742 | 743 |

Figure 9

Generic Telephone System
Welcome Larry | Log Out

Help For This Page
1000

Blank Rules - Inbound Calls - Before Ringing Telephone

Which condition(s) do you want to check?

```
Calling number is (or is not) in address book
Calling number is (or is not) in list ...
Calling number matches (or doesn't match) pattern ...
Calling number is (or is not) UNKNOWN
Calling number is (or is not) marked PRIVATE          1010
Calling number is (or is not) a ...
Calling number is (or is not) Inter-LATA
Calling name is (or isn't) in list ...
Calling name matches (or doesn't) pattern ...
Calling name is UNKNOWN
```

Rule Description (Click on an underlined value to edit it):

Apply this rule on inbound calls where the — 830
calling number is in the address book.

| Cancel | Back | Next | Finish |
|--------|------|------|--------|
| 740    | 741  | 742  | 743    |

Figure 10A

Generic Telephone System
Welcome Larry | Log Out

Help For This Page
1000

Blank Rules - Inbound Calls - Before Ringing Telephone

Which condition(s) do you want to check?

```
Calling number is (or is not not) in address book
Calling number is (or is not) in list ...
Calling number matches (or doesn't match) pattern ...
Calling number is (or is not) UNKNOWN
Calling number is (or is not) marked PRIVATE           1010
Calling number is (or is not) a ...
Calling number is (or is not) Inter-LATA
Calling name is (or isn't) in list ...
Calling name matches (or doesn't) pattern ...
Calling name is UNKNOWN
```

Rule Description (Click on an underlined value to edit it):

Apply this rule on <u>inbound</u> calls where the calling number <u>is</u> in the <u>address book</u> and where the calling number <u>matches</u> a <u>pattern</u>. —830

| Cancel | Back | Next | Finish |
|--------|------|------|--------|
| 740    | 741  | 742  | 743    |

Figure 10B

Generic Telephone System     Welcome Larry | Log Out

Help For This Page
1400

Blank Rules - Inbound Calls - Before Ringing Telephone

Please specify a name for this rule:

| Special ring tone #1 | —1410

☑ *Turn on this rule* —1411

☐ Create this rule on all phone numbers —1412

Rule Description (Click on an underlined value to edit it):

| Apply this rule on <u>inbound</u> callswhere the calling number <u>is</u> in the <u>address book</u>and where the calling number <u>matches</u> a <u>pattern</u>. Pass the call through. Ring with special <u>ring-tone</u>. | —830

| Cancel | Back | Next | Finish |
| 740 | 741 | 742 | 743 |

INCOMING AND OUTGOING CALL CONTROL CUSTOMIZATION

CROSS-REFERENCE TO RELATED APPLICATIONS

This application is a continuation of U.S. patent application Ser. No. 11/282,662, filed on Nov. 21, 2005, the disclosure of which is expressly incorporated herein by reference in its entirety.

BACKGROUND OF THE INVENTION

1. Field of the Invention

The present invention relates to the field of telecommunications. More particularly, the present invention relates to enabling subscribers to create customized call control rules for subscriber specified call identification and disposition.

2. Background Information

Currently, subscribers to various call related services, such as call forwarding, call screening, call blocking and voice mail, have a limited ability to alter the implementation of these services. There are presently interfaces provided by the service providers that narrowly enable a subscriber to make changes to the existing call services, using confusing web pages or other interfaces, and affecting limited parameters. For example, typical call service interfaces list options that enable a subscriber to activate or deactivate entire features, but do not allow the subscriber to change the features themselves, either in determining how to identify or dispose of certain calls in accordance with the subscriber's criteria. Therefore, if the subscriber wants to have customized call control outside the preset call control configurations made available by the service provider, the underlying system would not support the customized call control, the subscriber would have to understand and implement relatively complex computer programming, or both.

Accordingly, a need exists for a flexible and user-friendly interface to a telecommunication network, enabling an average subscriber to build and edit complex call control rules and to customize his or her call control services for implementation by the network.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 9 is an exemplary Web page for creating an inbound call rule using blank rules, according to an aspect of the present invention;

FIGS. 10A and 10B are exemplary Web pages for identifying conditions for an inbound call rule, according to an aspect of the present invention;

FIG. 14 is an exemplary Web page for naming the call control rule, according to an aspect of the present invention.

DETAILED DESCRIPTION

Figure 1:
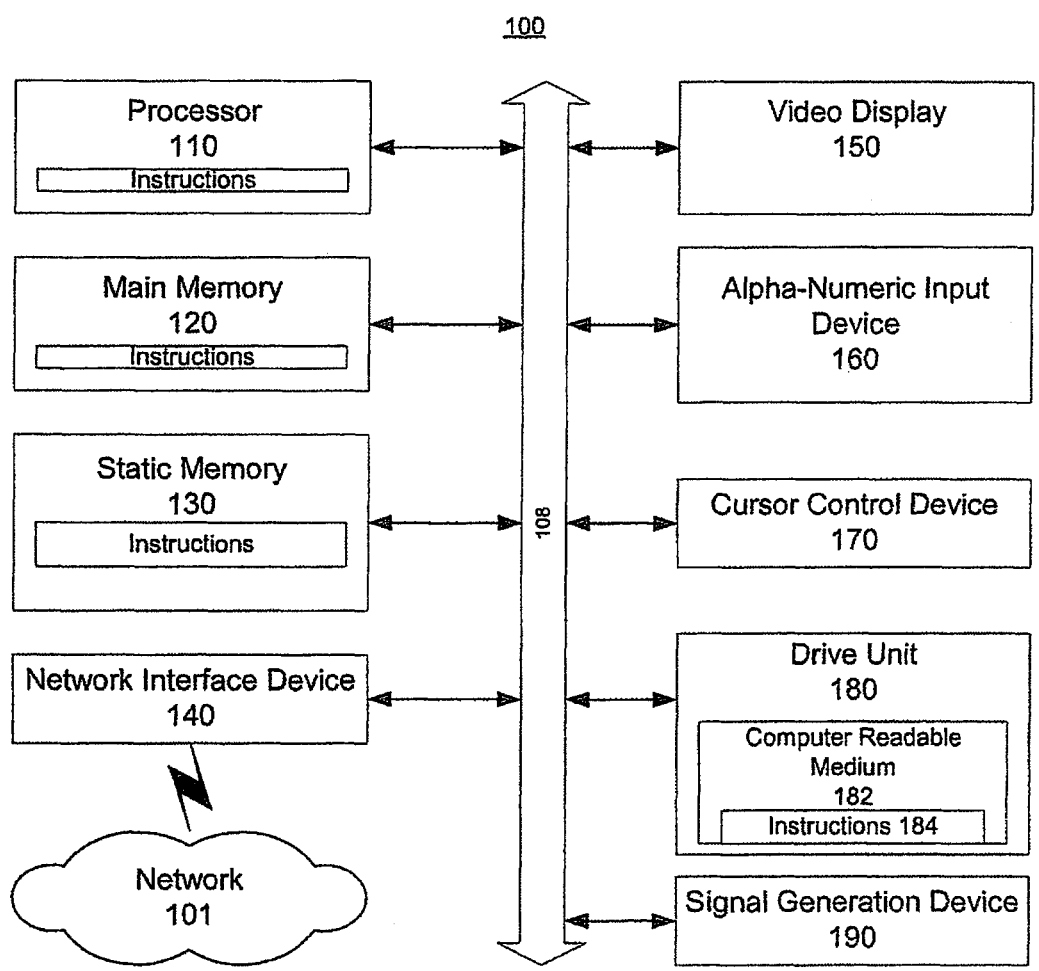
FIG. 1 shows an illustrative embodiment of a general computer system for implementing various aspects of the present invention.

The present invention relates to enabling a service subscriber to flexibly build complex, customized call control rules, without the assistance of the network service provider and without having to be a computer programming expert. The services to which the present invention applies includes all conventional call control services offered by the network service provider. These services include, for example, a call monitoring service that set restrictions on incoming and outgoing telephone calls for a subscriber based, for example, calling party names and numbers and time of day, day of week scheduling. Personal identification numbers may be provided to enable the calling party or the called party to override existing restrictions on the incoming and outgoing calls, respectively, based on previously provided instructions from the subscriber.

In view of the above, the present invention through one or more of its various aspects and/or embodiments is presented to accomplish one or more objectives and advantages, such as those noted below.

An aspect of the present invention provides a method for customizing a call control rule by a subscriber at a graphical user interface, the call control rule being associated with at least one telephone number of the subscriber in a telecommunications network. The method includes providing a first display, including multiple independent conditions relating to identifying calls involving the subscriber's telephone number, and receiving a first selection of at least one identifying condition. The method further includes providing a second display, including multiple independent call dispositions relating to processing the calls based on the at least one selected condition, and receiving a second selection of at least one call disposition. The at least one identifying condition and the at least one call disposition are stored as the call control rule in association with the subscriber's telephone number, and calls involving the telephone number are processed in accordance with the stored call control rule. The identifying condition and the disposition of the call may not have a predetermined relationship.

The method may also include providing a third display describing the call control rule contemporaneously with receiving the first selection and the second selection. The third display may include at least one variable in the third display, and a third selection, defining the at least one variable in the third display, may be received. For example, the variable may be directed to an address book, so that defining the variable includes identifying one of a number of address book categories, each category including at least one telephone number. The variable may be directed to a ring-tone, so that defining the variable includes identifying one of a number of ring-tones corresponding to the call disposition. Also, the variable may be directed to an indication of whether the call control rule applies to an inbound call or an outbound call, or an indication of whether the call control rule applies before or after ringing a device corresponding to the subscriber's telephone number.

Another aspect of the present invention provides a system for customizing a call control rule by a subscriber associated with at least one telephone number of the subscriber, including a web server in a packet switching network and a database. The web server is accessible by the subscriber from a graphical user interface, and displays at the graphical user interface multiple independent conditions relating to identifying calls involving the telephone number, and separately displays multiple independent call dispositions relating to the identified calls. The web server receives selections of at least one identifying condition and at least one corresponding call disposition. The database stores the at least one identifying condition and the at least one call disposition received from the web server as the call control rule, and is accessible by a processor in a telecommunications network to implement the call control rule for calls involving the at least one telephone number. The packet switching network may be the public Internet. Also, the telecommunications network may be the PSTN and the processor includes a service control point, or the telecommunications network may be the Internet and the processor includes a proxy server.

The web server may dynamically display at the graphical user interface a description of the call control rule corresponding to the received selections of the identifying condition and corresponding call disposition. The description may further include at least one variable, where the web server receives additional data corresponding to the variable further defining the call control rule.

Another aspect of the present invention provides a computer readable medium for storing a computer program for customizing a call control rule by a subscriber via a graphical user interface through a packet switching network, the call control rule being associated with at least one telephone number of the subscriber in a telecommunications network. The computer readable medium includes a display code segment that displays on the graphical user interface multiple conditions relating to identifying calls involving the telephone number and multiple call dispositions relating to identified calls; a receiving code segment that receives from the graphical user interface selections of at least one identifying condition and at least one call disposition; and a storing code segment that stores the identifying conditions and call dispositions as the call control rule in association with the telephone number. Calls involving the telephone number of the subscriber are then processed in the telecommunications network in accordance with the stored call control rule. The display code segment may further display a description of the call control rule at the graphical user interface after the receiving code segment receives the selections of the at least one identifying condition and at least one call disposition.

Yet another aspect of the present invention provides a method for customizing a call control rule by a subscriber via a graphical user interface over a packet switching network, the call control rule being associated with at least one telephone number of the subscriber in a telecommunications network. The method includes providing multiple options for building a call control rule, at least one option includes using a template. When the template option is selected, at least one template is displayed at the graphical user interface, and a selection of the desired template is received. The desired template includes at least one condition relating to identifying calls involving the at least one telephone number and at least one call disposition relating to the identified calls. When the template option is not selected, multiple conditions relating to identifying calls involving the at least one telephone number and multiple dispositions relating to the identified calls are displayed at the graphical user interface, and selections of at least one identifying condition and at least one call disposition are received. The at least one identifying condition and the at least one call disposition are stored as the call control rule in association with the telephone number, and calls in the telecommunications network involving the telephone number are processed in accordance with the stored call control rule.

At least one variable may also be displayed in the description of the selected template when the template option is selected. Then, additional data defining the at least one variable may be received. When the template option is not selected, descriptions of the selected at least one identifying condition and the at least one call disposition are displayed.

The various aspects and embodiments of the present invention are described in detail below.

Referring to FIG. 1, an illustrative embodiment of a general computer system, on which the incoming and outgoing call control can be implemented, is shown and is designated 100. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), an internet protocol (IP telephone), an analog terminal adapter (ATA), a palmtop computer, a desktop computer, a communications device, a land-line telephone, a control system, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or subsystems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In an embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single hardware medium or multiple hardware mediums, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The present invention is intended to function with any telecommunications network, including, for example, frame, cell or packet switching networks, that supports private line, data and video services, without affecting the spirit and scope of the invention. The telecommunications networks include, for example, time division multiplex (TDM) wireline and wireless networks, as used in conventional advanced intelligent network (AIN) environments in the PSTN, VoIP wireline and wireless networks using the Internet, as well as ATM and other types of networks. The network must include a rules engine, which applies the stored call control rules against inbound and outbound calls, and processes the corresponding call dispositions.

Figure 2:
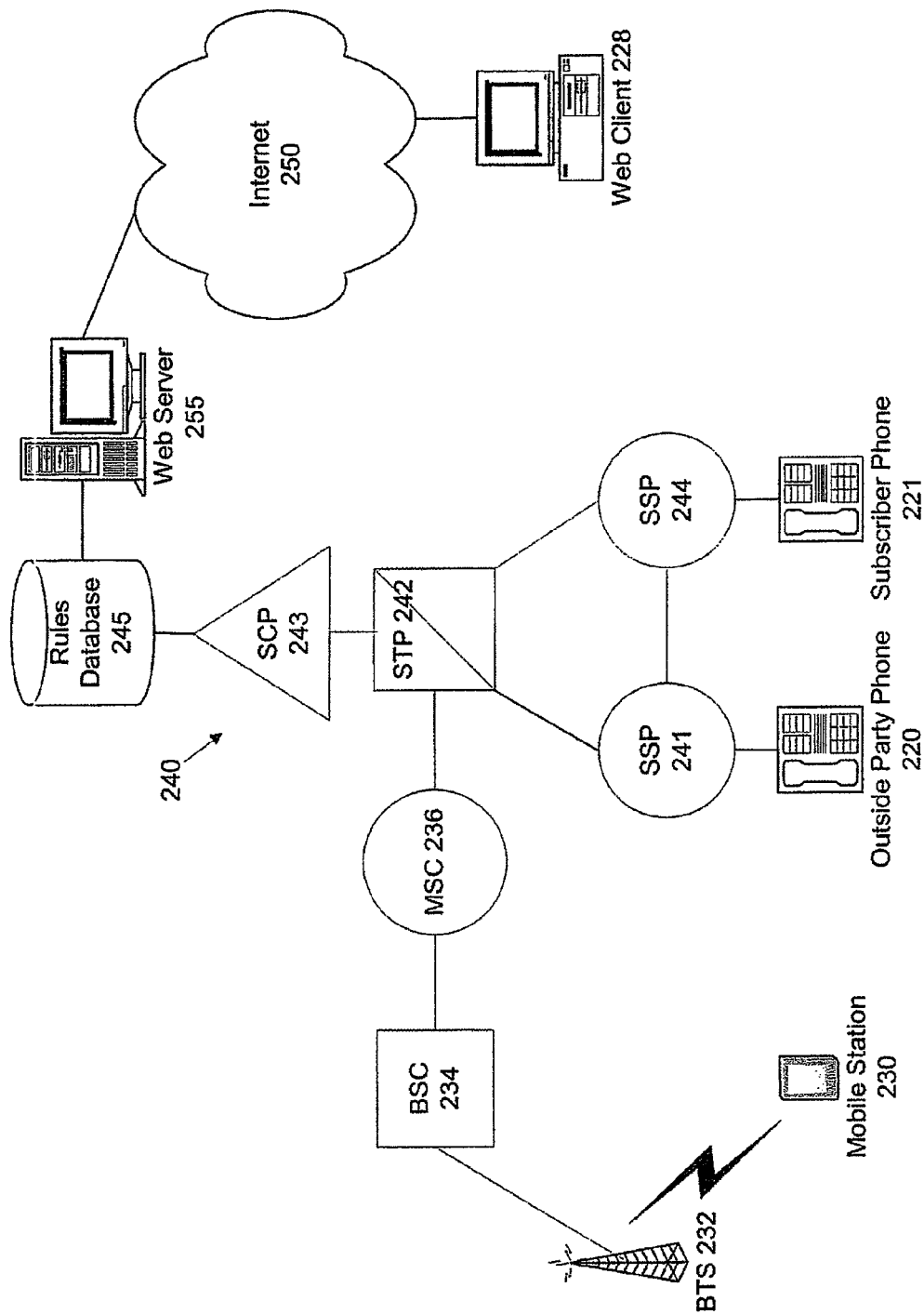
FIG. 2 is a block diagram showing an exemplary telecommunications network for incoming and outgoing call controls, according to an aspect of the present invention.

FIG. 2 in particular is a block diagram showing an exemplary embodiment of the present invention as implemented in an AIN environment, and includes both wireless and wireline implementations. The telecommunications network includes a service control point (SCP) 243, which provides the rules engine, and a signaling transfer point (STP) 242 for processing calls in the public switched telephone network 240. By way of example, the SCP 243 is implemented with the Bellcore Integrated Service Control Point™, loaded with ISCP software Version 4.4 (or higher), available from Telecordia™, Murray Hill, N.J. In an alternative embodiment of the invention, the SCP 243 may be a Lucent Advantage SCP™, with software release 94, available from Lucent Technologies™, Inc. The SCP 243 processes calls in the AIN and includes consideration of the services activated on behalf of the various subscribers. The SCP 243 may access various databases, including the rules database 245, which stores the subscribers' respective call control rules, names associated with telephone numbers, and other call routing and disposition data. The databases may be internal or external to the SCP 243 and may include a table format. The SCP 243 interfaces with external databases through any compatible protocol, such as SR-3389 or SR-3511. The call flow logic of the present invention may be upgraded to accommodate future AIN releases and protocols and future trigger types.

Further, in an alternative embodiment, the call control functionality may be external to the SCP 243, for example, when Parlay application program interface (API) functionality is incorporated. An SCP supporting Parlay is typically referred to as a Parlay Gateway. The external program that uses Parlay APIs to control the underlying telephone network through the Parlay Gateway is referred to as a Parlay Client. In this embodiment, the call control rule functions are implemented in the Parlay Client.

Also included in the PSTN 240 are representative central office switches. In particular, FIG. 2 depicts a first service switching point (SSP) 241 servicing an outside party telephone 220, and a second SSP 244 servicing the subscriber telephone 221. The SSPs 241 and 244, the STP 242 and the SCP 243 are capable of communicating with one another using out-of-band signaling, such as signaling system 7 (SS7), although it is understood that any comparable signaling transport may be incorporated in the invention, including for example X.25 and IP.

The outside party telephone 220 and the subscriber telephone 221 may be any type of PSTN compatible telephone or system, including, for example, a plain old telephone service (POTS) telephone, or a telephone in a Centrex system, a PBX system, an internet PBX (iPBX) system or electronic key telephone system (EKTS). Depending on the call origination point, the SSP 241 and the SSP 244 may be either the originating or the terminating switch. For example, if a call is placed from the outside party telephone 220 to the subscriber telephone 221, the SSP 241 is the originating switch and the SSP 244 is the terminating switch. If a call is placed from the subscriber telephone 221 to the outside party telephone 220, the SSP 244 is the originating switch and SSP 241 is the terminating switch. However, as a practical matter, the originating switch and the terminating switch may be the same, or the call may be routed through any number of intervening switches in the PSTN between the originating and the terminating switches.

The SSPs 241 and 244 are capable of recognizing AIN triggers, including triggers associated with calling and called party numbers and trunk groups. They may include, for example, 1AESS™ or 5ESS™ switches manufactured by Lucent Technologies™, Inc.; DMS-100™ switches manufactured by Nortel Networks™ Corporation (Nortel); AXE-10™ switches manufactured by Telefonaktiebolaget LM Ericsson™, or EWSD™ switches available from Siemens Information and Communication Networks™, Inc. The switches may utilize an AIN Release 0.1 protocol. However, embodiments of the present invention may incorporate switches, such as ATM switches, that are incorporated into any alternative telecommunications technology.

A data network of the invention includes a web server 255 and a rules database 245, for example, connectable to the web client 228 through the Internet 250. The web client 228 includes a graphical user interface (GUI), e.g., a PC operating a web browser, such as Microsoft Internet Explorer™, available from Microsoft™ Corporation, or Netscape Navigator™, available from Netscape Communications™ Corporation, or other software enabling communication with the web server 255 over the Internet 250. In an embodiment, the web client 228 may additionally run client software provided by the service provider.

The rules database 245 is configured to send and receive data to and from the SCP 223, and effectively provides the subscriber an interface to the SCP 223 from the web client 250 (or any other Internet compatible device) through the web server 255, via the Internet 250. The rules database 245 stores and distributes subscriber specific data relating to the call control services, including account numbers, passwords and other authentication data, PIN numbers to bypass call blocking features, call specific data and subscriber report information.

In one embodiment, the web client 228 is implemented with an IBM Pentium™ based PC, running the Linux™ operating system, available from, for example, Free Software Foundation™, Inc., or the Microsoft Windows™ operating system, and running the Microsoft Internet Explorer™, Netscape Navigator™ or HotJava™, available from Sun Microsystems™, Inc., web browser software. An embodiment of the invention includes the web server 255 running either the Linux™ or the Microsoft Windows™ operating system and the Apache™ web server software, available from the Apache Software Foundation™, or the Jigsaw™ web server software, available from World Wide Web Consortium™ (W3C). Each of the depicted processor, including the web client 228, the web server 255, the rules database 245 and the SCP 243 may be computers as described, for example, with respect to FIG. 1, above.

FIG. 2 further depicts an exemplary wireless interface with the PSTN. In particular, the network includes a mobile services switching center (MSC) 236, which communicates with the PSTN through the STP 242. The MSC 236 may be, for example, an Alcatel 1000 MSC™ switch manufactured by Compagnie Financière Alcatel™ (Alcatel), an 5ESS-2000™ switch manufactured by Lucent™, a DMS-MTX™ switch manufactured by Nortel™, or the like.

The MSC 236 is connected to multiple base station controllers (BSCs), including for example BSC 234. In turn, BSC 234 is connected to multiple base transceiver stations, (BTSs), including for example BTS 232. The mobile station 230 wirelessly communicates with the BTS 232, which interfaces with the SCP 243 for call disposition through the BSC 234 and the MSC 236. The mobile station 230 may be any wireless communication device, such as a cellular telephone, a PDA, a laptop computer, or the like. Of course, depending on the geographical position of the mobile station 230, a different BTS, BSC and/or MSC may be involved in completing the communication. The number of base stations serviced by the MSC 236 is a function of the design of the wireless network. It is further understood that the BTS 232 communicates with the mobile station 230 via any known wireless modulation and transmission techniques, including, for example, advanced mobile phone service (AMPS), code division multiple access (CDMA), direct sequence CDMA (DS-CDMA), cdma2000, IS-95, Global System for Mobile Communications (GSM), time division multiple access (TDMA), or the like.

Figure 3:
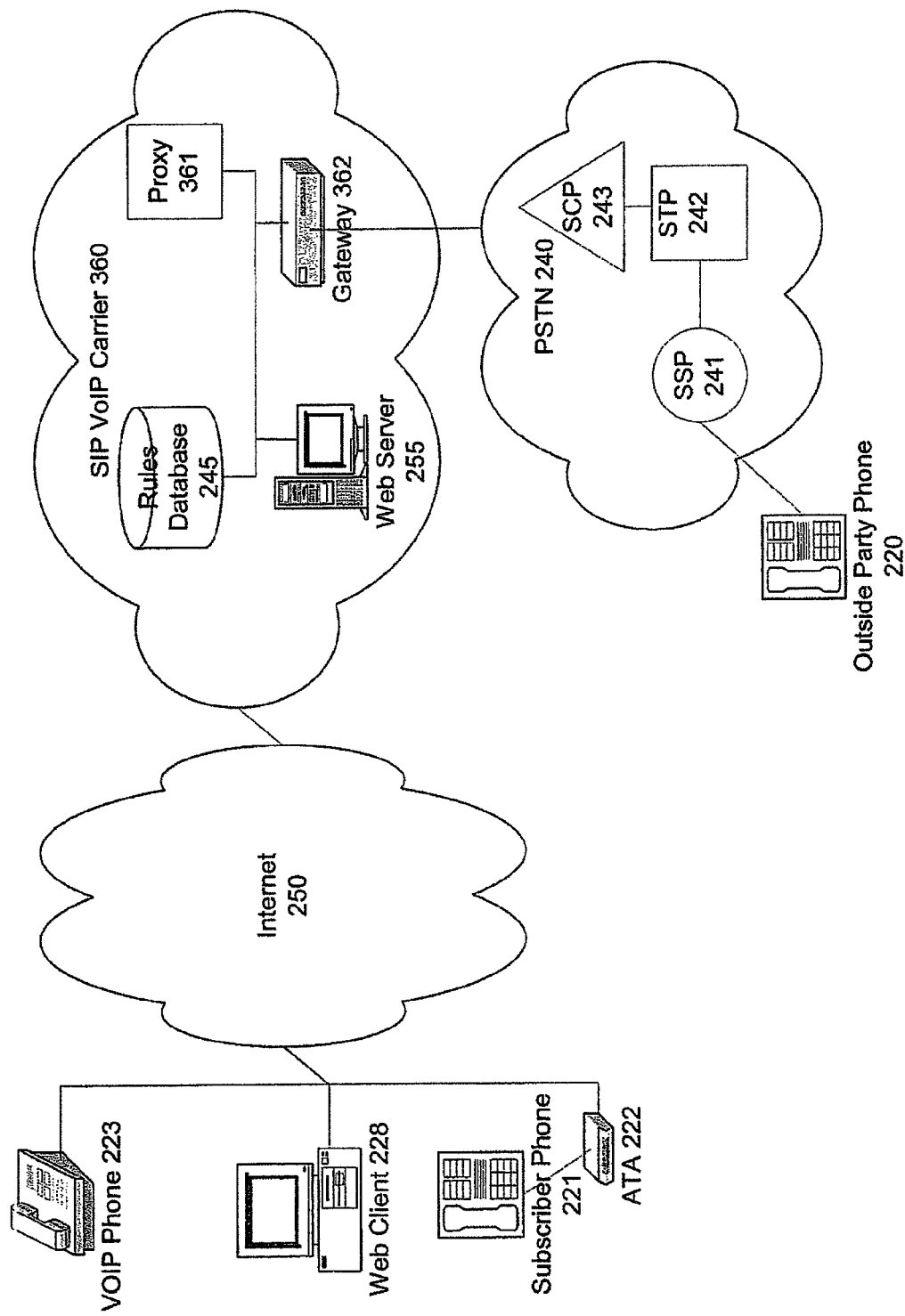
FIG. 3 is a block diagram showing an exemplary VoIP telecommunications network for incoming and outgoing call controls, according to an aspect of the present invention.

FIG. 3 is a block diagram showing an exemplary embodiment of the present invention as implemented in a typical VoIP network. FIG. 3 depicts a wireline implementation, although it is understood that it is equally applicable to wireless networks, for example, as described above with respect to FIG. 2.

More particularly, FIG. 3 shows various types of communication end systems or devices that are able to communicate using VoIP over the Internet 250. For example, the web client 228, when configured with a speaker and a microphone, may be used for VoIP calls. The web client 228 accesses the Internet through any conventional high speed or broadband connection, including for example cable and digital subscriber line (DSL) connections. Likewise, a VoIP telephone 223 is able to make VoIP calls with no additional configuration, other than a high speed or broadband Internet connection. The VoIP telephone 223 may include, for example, the 4600™ series of IP telephones offered by Avaya™, Inc. A conventional analog telephone, such as the subscriber telephone 221, can also be used for VoIP communications, with the addition of equipment, such as the analog telephone adaptor (ATA) 222, capable of converting signaling and voice (or other traffic) from the subscriber telephone 221 to IP.

Calls to and from any of the subscriber end systems necessarily pass through the Internet 250. The calls are controlled by a carrier, as indicated, for example, by the SIP (session initiation protocol) VoIP Carrier 360, which is depicted separately from the Internet 250 for the sake of simplifying the discussion. The SIP VoIP Carrier 360 includes the Rules Database 245 and the web server 255, which generally include the same functionality as discussed above with respect to FIG. 2.

The SIP VoIP Carrier 360 also includes a proxy 361 which identifies the various conditions of calls made to and from the subscriber end systems, and determines the dispositions based on the same, thus effectively functioning as the rules engine. Generally, the proxy 361 makes call routing determinations based, in part, on the call control rules stored in the rules database 245, such as call blocking, call forwarding, call screening and other services. (The rules database 245 may be accessed and updated by the subscriber via the web client 228 and the web server 255, as discussed above with respect to FIG. 2 above.) For example, the SIP VoIP Carrier 360 receives call setup signaling messages via the Internet 250 relating to calls placed from the subscriber telephone 221. Pursuant to the signaling, the proxy 361 receives the IP address associated with the subscriber telephone 221, as well as the called telephone number. The proxy 361 is able to access a database indicating IP addresses associated with telephone numbers, thus indicating the telephone numbers capable of receiving VoIP calls.

When the called party cannot receive VoIP calls (e.g., the outside party telephone does not have an ATA, and is not a VoIP telephone or PC with Internet access), the proxy 361 determines that the call must be forwarded over the PSTN 240, and a gateway 362 is needed to interface with the PSTN 240. The gateway 362 may be any device capable of interfacing the PSTN 240, including, for example, a Siemens SUR-PASS hiG 1200 Media Gateway. In an embodiment of the invention, when the gateway 362 is used, the subscriber telephone 221 connects directly to the gateway 362 through the Internet 250 using, for example, Real-Time Transport Protocol (RTP) packets, while the call signaling still goes through the proxy 361, enabling implementation of the call control rules. The PSTN 240 is shown to include the SCP 243, the STP 242 and the SSP 241 for connecting the call to the outside party telephone 220, each of which is discussed above.

Figure 4A:
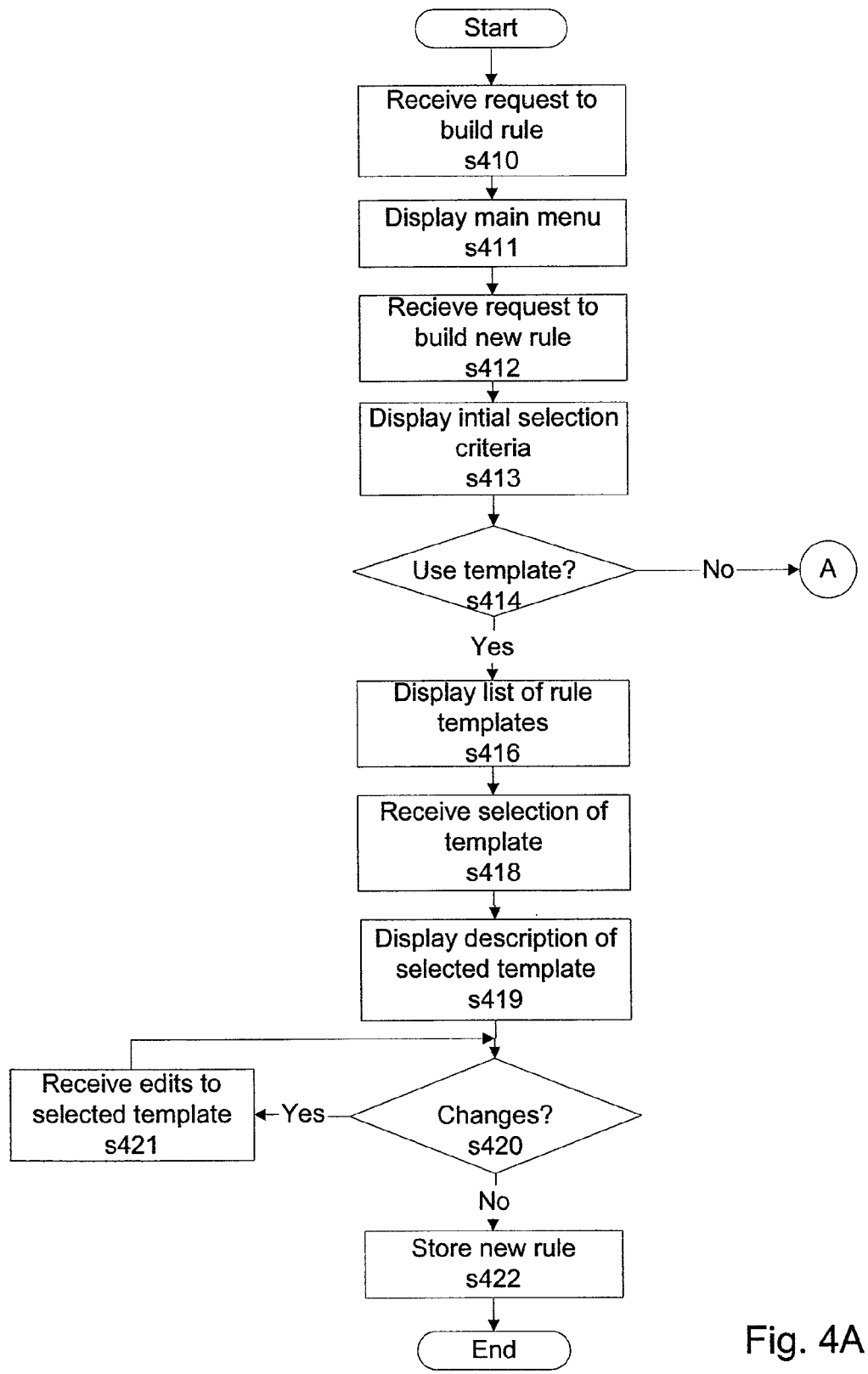
FIGS. 4A and 4B depict a flow chart showing an exemplary implementation of an embodiment of the invention.
Figure 4B:
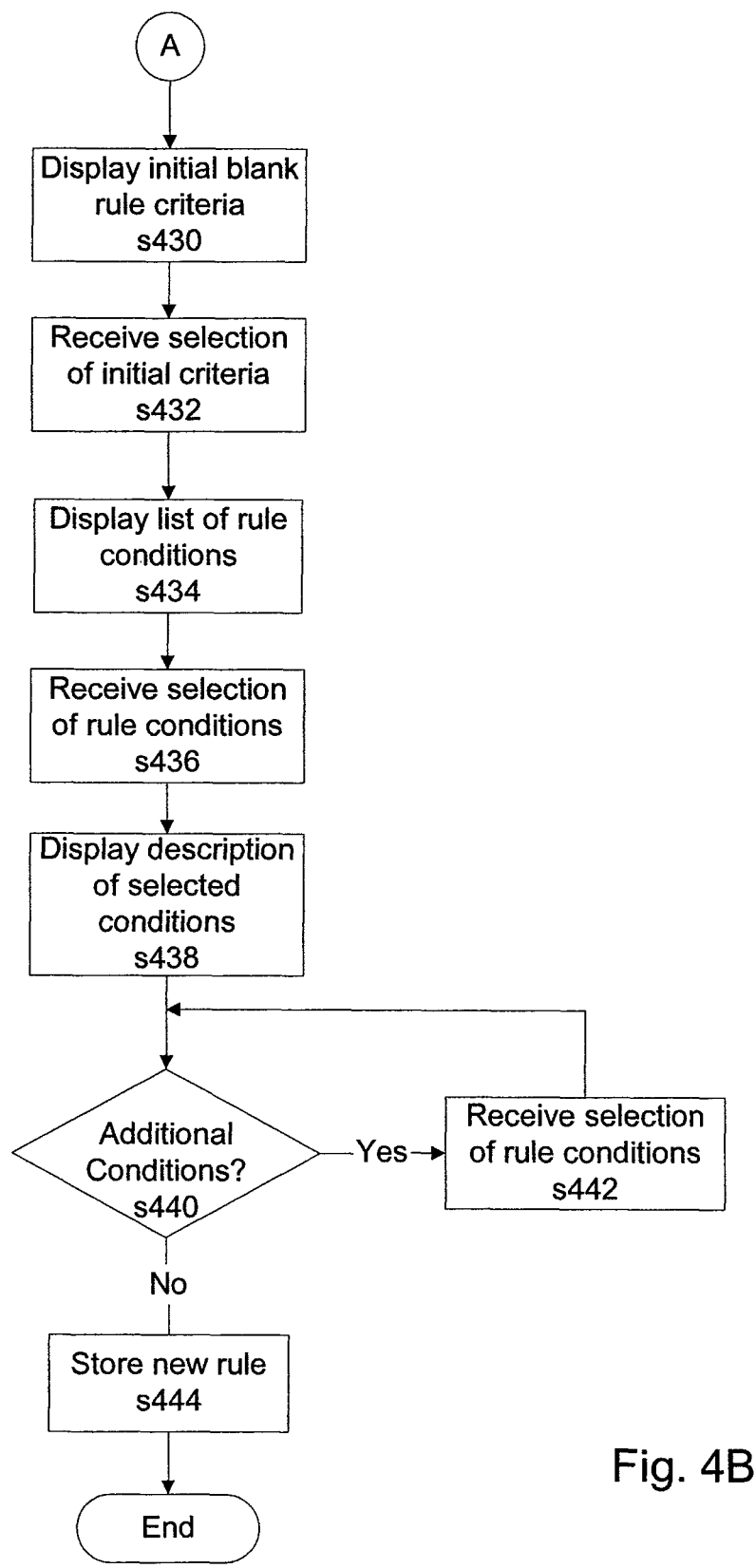

Regardless of the network environment, the invention as it relates to building customized call control rules is implemented in essentially the same manner. For example, FIGS. 4A and 4B depict a flow chart showing exemplary software logic run by a processor to enable the subscriber to build new call control rules according to an embodiment of the present invention. The logic may be implemented, for example, on the web server 255, which is accessible by the subscriber from any device capable of communicating over the Internet 250, including, for example, the web client 228. It is understood that the invention is not limited to the specific steps discussed below, and thus, they should not be interpreted as limiting the scope of the invention; alternative steps achieving the same results relating to subscriber customization of call control rules may be employed without departing from the scope and/or spirit of the invention.

In step s410 of FIG. 4A, the web server 255 receives a request from the subscriber to build a call control rule. The subscriber accesses the web server 255, for example, using a unique uniform resource locator (URL) associated with the service. In alternative embodiments of the invention, the subscriber must be authenticated before being permitted access to the call control rule service. For example, the web server 255 may cause web pages to be displayed at the web client 228 requesting an account number and password, or other authentication data, before allowing the subscriber access to the subscriber's data in the call control rule service or the rules database 245.

After authentication, the web server 255 displays a home page or main menu at step s411, such as the exemplary web page 500 of FIG. 5, discussed below, which is the main menu of the subscriber's call control interface, according to an embodiment of the invention. The actual layout of the web pages depicted herein, as well as the specific options made available to the subscriber on the web pages, may vary, without departing from spirit and scope of the present invention.

The web server 255 then receives requests for various functions available to the subscriber at the main menu, including, for example, making changes to existing call control rules and creating new call control rules relating to existing or new services (e.g., call forwarding and call blocking). FIG. 4A, in particular, shows the web server 255 receiving a request to build a new call control rule at step s412. The web server 255 responds by displaying the initial rule building criteria at the web client 228 at step s413. An example of the initial rule building criteria is depicted in web page 700 of FIG. 7, discussed below.

At step s414, the web server 255 receives information regarding indicates whether the new call control rule is to be built using a template. When the subscriber selects using a template, the process proceeds to step s416, in which the web server 255 displays the list of rule templates available to the subscriber, for example, in the Select Rule Template box 720 of FIG. 7. The subscriber's selection of a template is received at step s418, in response to which the web server 255 displays the text of the template at step s419, for example, in the Rule Description box 731 of FIG. 7.

The template is not static, but is merely a starting point for the subscriber. The subscriber can accept the call control rule in its entirety, as is, or make changes to the template to further customize the call control rule. Accordingly, at step s420, it is determined whether any changes to the template are to be made. If YES, then the web server 255 receives the edits at step s421, and returns to step s420 to determine whether any additional changes are to be implemented. This cycle continues until the subscriber indicates that the new call control rule is satisfactory and there are no further changes to the template. The process then proceeds to step s422, at which the web server 255 causes the new rule to be stored, for example, at the rules database 245. The rule is now ready for immediate implementation, e.g., by the SCP 243 or the proxy 361.

Returning to step s414, the alternative to using a template is to build the new rule from scratch, using blank rule criteria. The initial blank rule criteria are displayed on the web client 228 at step s430 of FIG. 4B. Exemplary web pages indicating initial blank rule criteria are shown in web pages 800 and 900 of FIGS. 8 and 9, respectively. At step s432, the web server 255 receives the subscriber's selection of the initial criteria, which may include, for example, such information as whether the new rule involves inbound or outbound calls, and whether the new rule should be applied before or after the subscriber's telephone rings.

Once the initial criteria are established, the web server 255 displays a list of rule conditions (e.g., corresponding to the initially selected criteria) on the web client 228 at step s434. The various conditions are shown, for example, in the Rule Conditions box 1010 of exemplary web page 1000, shown in FIGS. 10A and 10B, discussed below. The web server 255 receives the subscriber's selection of a condition at step s436, and displays the corresponding description of the selected condition as the rule is being built at step s438.

At step s440, it is determined whether any additional conditions are to be added to the call control rule. If YES, then the web server 255 receives the additional conditions at step s442, and returns to step s440 to determine whether any additional conditions are to be implemented. The various additional conditions are shown, for example, in the Rule Conditions box 1010 of exemplary web page 1000, which keeps a running description of the conditions as they are selected by the subscriber, for example, by highlighting the listed conditions in the Rule Conditions box 1010. This cycle continues until the subscriber indicates that the new call control rule is satisfactory and there are no further conditions. The process then proceeds to step s444, at which the web server 255 causes the new rule to be stored, for example, at the rules database 245. The rule is now ready for immediate implementation, e.g., by the SCP 243 or the proxy 361.

As discussed above, FIGS. 5-14 show web pages to be displayed on the web client 228, for example, according to an embodiment of the present invention. The sample web pages are merely examples and are not limiting with respect to the scope and spirit of the invention. Referring to FIG. 5, in particular, the main menu web page 500 requests a telephone number to which the call control rules are to be applied. There are separate rule sets for each telephone number. The telephone number may be typed into the telephone number field 501. Alternatively, if the subscriber is accessing the call control system from his or her own computer, such as web client 228, or has been otherwise adequately authenticated, the applicable telephone number may be selected from a previously entered drop-down list of telephone numbers.

Also included in the exemplary web page 500 is a Apply Rules box 510, in which the various rules applicable to the telephone account number in field 501 are listed. As indicated, the rules are applied in the order in which they are listed, top to bottom. The rules shown in this example are "Privacy Manager," "Anonymous Call Rejection," "Selective Call Forwarding" and "Default." By selecting or clicking on of the rules in the Apply Rules box 510, the subscriber can perform a number of tasks related to the selected rule. For example, the Privacy Manager Rule is highlighted or selected, and thus a narrative description corresponding to the Privacy Manager Rule is shown in the text of the Rule Description box 520, discussed below.

The order in which the rules are applied is important with respect to how the call controls function. For example, when Default Rule is set, all calls are passed on to the applicable telephone (and then forwarded to voicemail, for example, if the call is not answered or the telephone is busy). Therefore, putting the Default Rule at the top of the list would prevent any of the other rules from ever running. The order in which the rules are listed may be changed in the depicted embodiment by selecting the desired rule and clicking the Move Up button 516 to move the rule above the next higher up rule, and clicking the Move Down button 517 to move the rule below the next lower rule in the list.

Adjacent to the Rules Display box 510 are five buttons. Clicking on the New button 511 enables the subscriber to create new call control rules. The process of creating a new rule is described below with respect to FIGS. 7-11, below.

Clicking the Copy button 512 creates a copy of the Rule presently highlighted in the Rules Display box 510, and places the copy at the end of the list. The name given to the copied rule is the name of the highlight Rule being copied, followed by "copy N," where N is a number used for identification purposes so that the copy's name is unique. For example, clicking the Copy button 511 with "Privacy Manager" selected creates a new rule at the bottom of the list in the Rules Display box 510 called "Privacy Manager copy 1." The purpose adding a copy of a rule, for example, is to enable the subscriber to use the copy as a template for creating another rule. Rule creation using templates is discussed below.

Clicking on the Modify button 513 allows the subscriber to make changes to the selected rule indicated in the Rules Display box 510. For example, when "Privacy Manager" is selected, clicking the Modify button 513 allows the subscriber to change the existing Privacy Manager Rule. Clicking on the Rename button 514 allows the subscriber to change the name of the selected rule. Because of the flexibility of the call control rules system, the subscriber is able to assign any name he or she wants to each of the various rules. Clicking on the Delete button 515 removes the selected rule. When a rule is deleted, the remaining rules stay in the listed order.

The Rule Description box 520 displays the description of the rule highlighted in the Apply Rules box 510. For example, the description of the Privacy Manager rule is "Apply this rule on inbound calls from UNKNOWN NAME before ringing the telephone. Challenge for ID with PIN override." The underlined words of the description, which look like web links, indicate that the settings associated with that function are variable, and if the subscriber desires, can be changed by clicking on the underlined portion.

Figure 6:
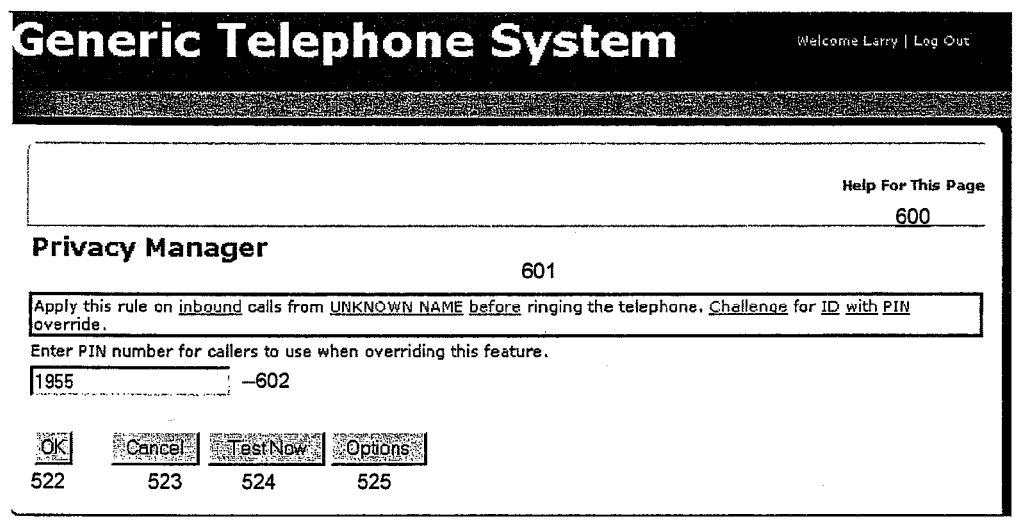
FIG. 6 is an exemplary Web page for changing an incoming call PIN, according to an aspect of the present invention.

For example, when the subscriber desires to change the PIN that callers (since the Privacy Manager Rule is applied to incoming calls) can use to override the call blocking, the subscriber clicks on "PIN." This action causes web page 600, shown in FIG. 6, to be downloaded from the web server 255 and displayed on the client 228. The web page 600 includes the same written description of the applicable Privacy Manager Rule box 601. A PIN box 602 is also displayed, storing the PIN number for callers to use in order to override the Privacy Manager rule. The current PIN 1955, can be changed by the subscriber clicking on the box 602 and entering another PIN. The new PIN is accepted by clicking the OK button 522.

The other modifiable settings shown in the written description likewise have corresponding web pages (not shown) to enable the subscriber to make desired changes. For example, "UNKNOWN NAME" can be changed to "UNKNOWN CALLING NUMBER" or "PRIVATE CALLING NUMBER," so that the rule is invoked whenever the calling number is unknown or private, respectively. Also, "before" can be changed to "after," so that the telephone rings, letting the called party know of the inbound call, even though the caller has not yet overridden the blocking. "Challenge" can be replaced with "NO Challenge," in which case the calling party is never given the opportunity to override the call blocking.

The exemplary web page 500 also includes four buttons below the Rule Description box 510 which apply to the rule that has been built and is currently displayed in the Rule Description box 510. The OK button 522 is selected in order to accept the rule, as described, for implementation. The Cancel button 523 allows the subscriber to exit from the call control program, without accepting the displayed rule. In other words, the call control program would retain the same rules and parameters that it had at the beginning of the session, when the web page 500 was first displayed. The Test Now button 524 allows the subscriber to test the call control rule against his or her call logs, as described, for example, in copending U.S. patent application Ser. No. 11/102,484, filed Apr. 8, 2005, the contents of which are incorporated by reference herein in its entirely, by displaying the subscriber's active call control rules. The Options button 525 provides the subscriber access a predetermined set of options relating to the call control program. In an embodiment of the invention, the Options include, for example, the ability to export and import call control rules (e.g., to and from other subscribers), and to upgrade to new templates.

Figure 5:
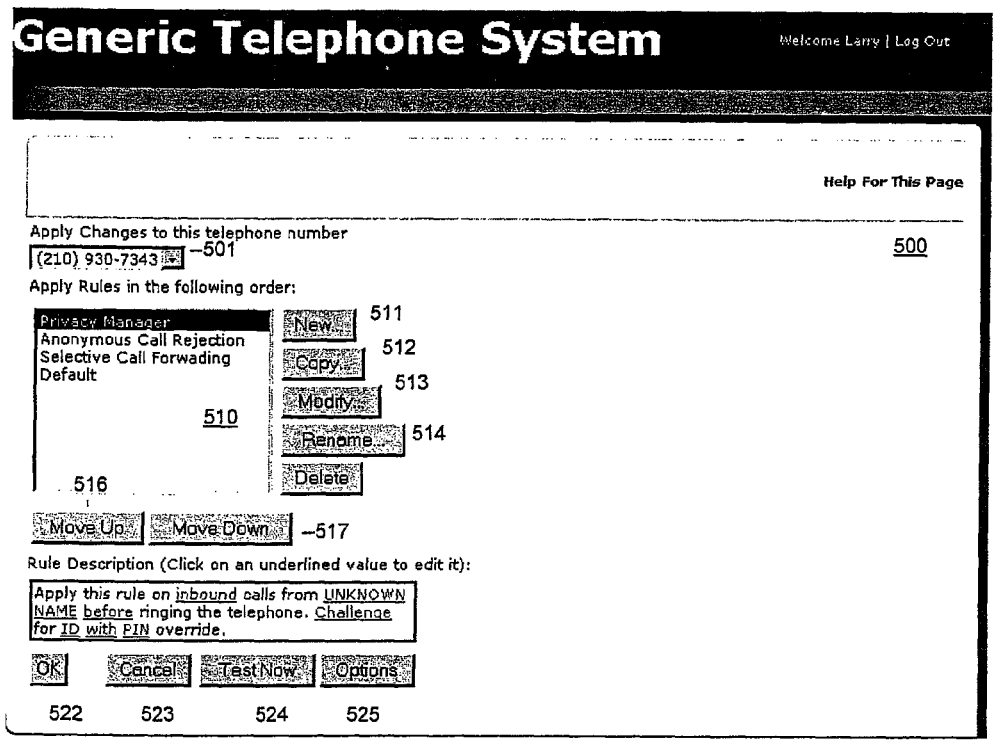
FIG. 5 is an exemplary Web page showing a rules controller entry point, according to an aspect of the present invention.
Figure 7:
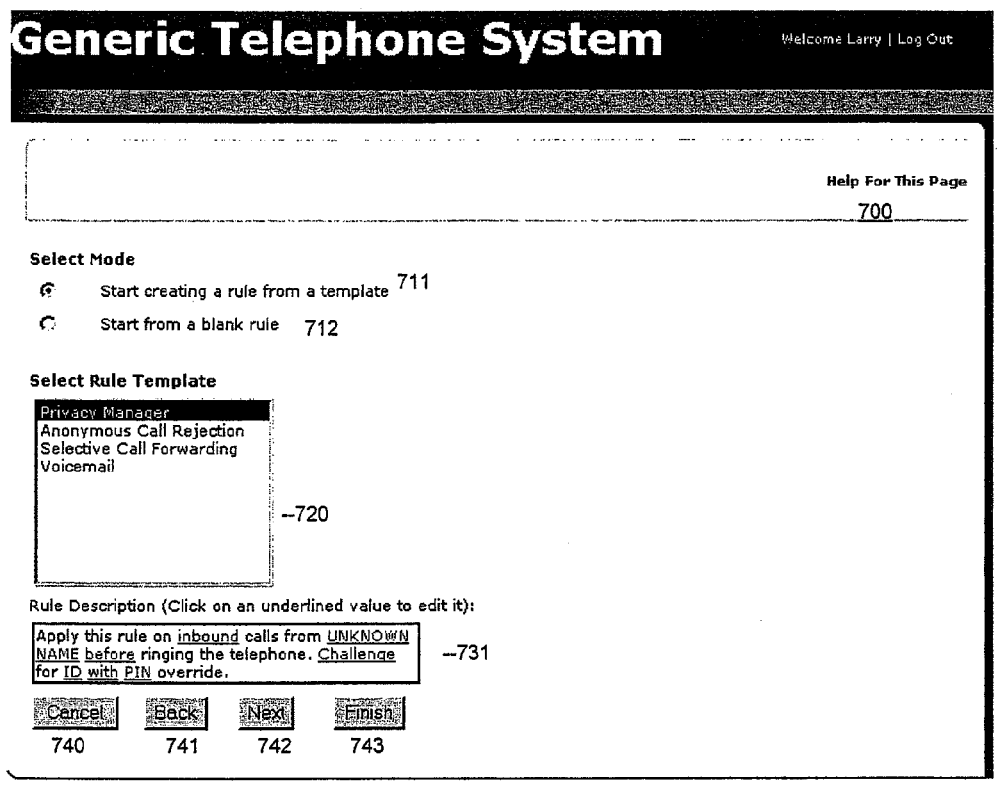
FIG. 7 is an exemplary Web page for creating a rule from a template, according to an aspect of the present invention.

FIG. 7 is an exemplary web page 700 according to an embodiment of the present invention which is provided by the web server 255 to the client 228 whenever the subscriber indicates a desire to create a new rule, such as by clicking on the New button 511 of web page 500 in FIG. 5. The web page 700 begins the process of creating a new call control rule by prompting the subscriber to make a selection of whether to start creating a rule from a predefined template, by clicking on radio button 711, or to start creating a rule from a blank rule (i.e., with no template), by clicking on radio button 712. As discussed above, when creating a rule from a template, the web server 255 provides predefined rule descriptions corresponding to various call control features. The Select Rule Template box 720 displays the templates available to the subscriber, which in this example, are "Privacy Manager," "Anonymous Call Rejection," "Selective Call Forwarding,"

and "Voicemail." In an embodiment of the invention, the templates are provided by the service provider in order to guide the subscriber through the many different call services that are available, indicating the most common implementation of the rules underlying these services. However, in alternative embodiments, the subscribers can additionally create their own templates or templates can be downloaded from third party web sites, for example, directed to call control rule formulation.

Web page 700 indicates that the Privacy Manager rule template has been selected. Accordingly, the Rule Description box 731 displays the template corresponding to the Privacy Manager rule. In this example, the template matches the description of Privacy Manager displayed in the Rule Description box 520 of web page 500, including the underlined variable settings, so discussion of this rule description will not be repeated.

After selecting a rule template from the list in box 720, the subscriber clicks on the Next button 742 to proceed to the next step in building the customized call control rule, as the template is only a starting point to guide the subscriber through building the customized rule. In an embodiment of the invention, the Next button 742 sequentially walks the subscriber through the various variable settings so that the subscriber may accept, reject or change each one. The Back button 741 enables the subscriber to return to an earlier step, if necessary to review or alter previous entries. The subscriber clicks on the Finish button 743 in order to complete the process of building a new call control rule from a template. In an embodiment of the invention, the Finish button 743 may be selected at any point, and the rule as it exists at that time will be implemented. For example, if the subscriber wants to merely use the template rule, he or she may simply select the Finish button 743 without having to step through the various modifiable settings. The Cancel button 740 cancels any additions or changes, ends the new rule creation process and returns the subscriber to a previous menu (e.g., web page 500 or 700).

Figure 8:
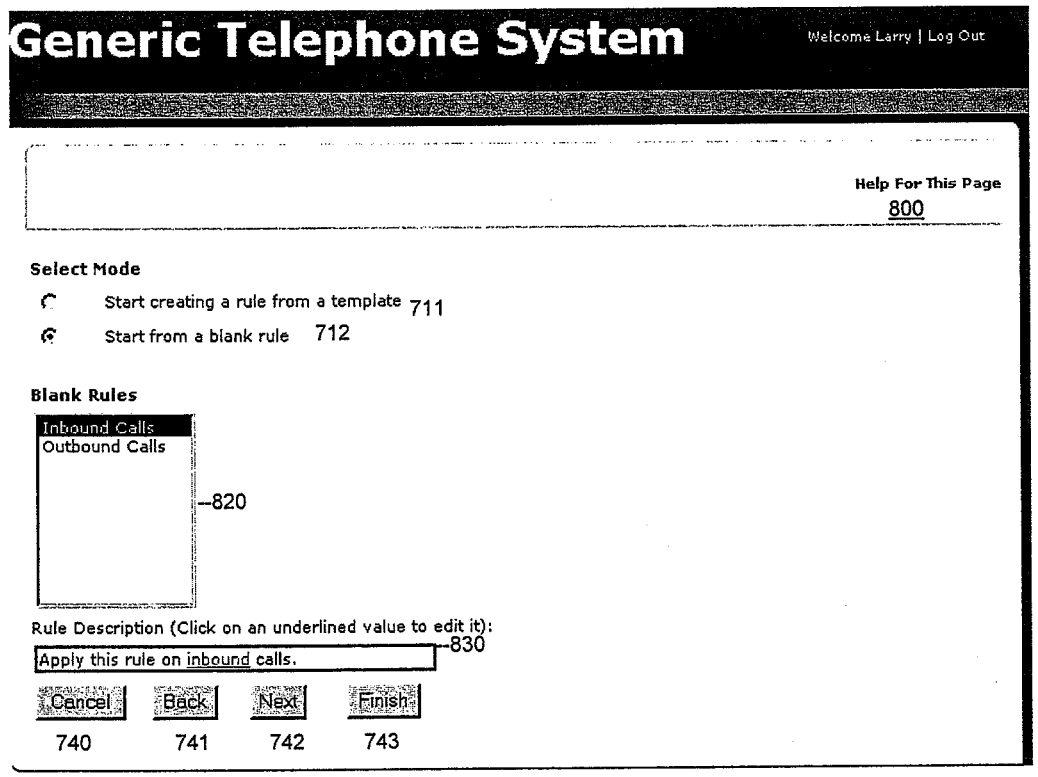
FIG. 8 is an exemplary Web page for creating a blank rule, according to an aspect of the present invention.

FIG. 8 is an exemplary web page 800 according to an embodiment of the present invention which is provided by the web server 255 to the client 228 whenever the subscriber indicates a desire to create a new rule, such as by clicking on the New button 511 of web page 500 in FIG. 5, and further, the subscriber has selected the "Start from a blank rule" radio button 712 from the select mode options. The web page 800 displays the various criteria available to build the call control rules in the Blank Rules box 820. The first step in building the customized rules is to identify the circumstances under which the rule is to be applied, including determining whether the new rule applies to inbound or outbound calls. Thus, the Blank Rules box 820 displays both "Inbound Calls" and "Outbound Calls," one of which is selected by the subscriber. In the exemplary web page 800, the subscriber has selected "Inbound Calls." The Rule Description box 830 reflects this selection, and displays "Apply this rule on inbound calls." The subscriber then selects the Next button 742.

The exemplary web page 900 of FIG. 9 is then displayed at the client 228. The web page indicates "Blank Rules-Inbound Calls," to confirm that the rule is being built from scratch and that it is to be applied to incoming calls. The web page 900 also provides the criteria under which the new rule is to apply, displayed in the Apply This Rule box 950. In an embodiment of the invention, the first criteria between which the subscriber chooses is "Before the phone can ring" and "After the phone can ring," as shown in the Apply This Rule box 950. This tells the call processor, e.g., the SCP 243 or the Proxy 361, when to apply the rule. This option allows the subscriber to decide whether the phone is allowed to ring before the rule is implemented, thus notifying the subscriber that an incoming call has been received (and is being processed). Otherwise, the phone does not ring unless the execution of the customized rule ultimately results in the phone ringing. For example, applying the rule before the phone rings support call blocking types of applications, while applying rules after the phone rings support voicemail types of applications. In the exemplary web page 900, the subscriber has selected "Before the phone can ring." The subscriber then selects the Next button 742, for example.

The exemplary web page 1000 of FIGS. 10A and 10B is then displayed at the client 228. The web page 1000 reflects the latest status of the rule being built, indicating "Blank Rules-Inbound Calls-Before Ringing Telephone." The web page 1000 also includes a Rule Conditions box 1010, which lists all of the optional conditions available to the subscriber based on the initial rule selections. For example, the conditions listed in the Rule Conditions box 1010 are the different types of conditions that can be invoked for an inbound call before the phone rings, which may include the following examples:

Calling number is (or is not) in address book
    Calling number is (or is not) in list XXX
    Calling number matches (or does not match) pattern XXX
    Calling number is (or is not) UNKNOWN
    Calling number is (or is not) marked PRIVATE
    Calling number is (or is not) payphone
    Calling number is (or is not) hotel
    Calling number is (or is not) Inter-LATA
    Calling name is (or is not) in list XXX
    Calling name matches (or does not match) pattern XXX
    Calling name is (or is not) UNKNOWN
    Time equals (not equals) XXX
    Time is (is not) between (start time) and (stop time)

The subscriber selects the conditions that will apply to the incoming calls by clicking on them. Rule Conditions box 1010 shows that the "Calling number is (or is not) in address book" condition has been selected. This condition is therefore added to the Rule Description box 830. Note that the condition is described in the Rule Description box 830 as "the calling number is in the address book," as opposed to "is not" in the address book. In an embodiment of the invention, the condition term not included in parenthesis is entered by default whenever the condition is selected. When the subscriber actually desires the negative of that selected condition, he or she may click on the word "is" in the Rule Description box 830 to obtain the "is not" entry. This is not intended to limit the scope of the invention, however. For example, in other embodiments, the negative conditions may simply be listed separately in the Rule Conditions box 1010, or the negative conditions may be selected by clicking twice on the same condition.

FIG. 10B shows the same web page 1000, except that now the Rule Conditions box 1010 further shows that the "Calling number matches (or doesn't match) pattern XXX." The Rule Description box 830 accordingly displays "and where the calling number matches a pattern" as an additional condition to the new call control rule. The conditions are added to the new rule in the same manner until the desired call control rule is obtained. The subscriber then clicks on the Finish button 743 to accept the new rule.

In an embodiment of the invention, the Rules Database 245 is automatically updated with the new rule, along with any other changes to the call control program, whenever the subscriber exits from the website. Alternatively, the Rule Database may be updated immediately upon the subscriber selecting the Finish button 743. In any case, the new rule will be immediately available for implementation in the telecommunications network.

Figure 11:
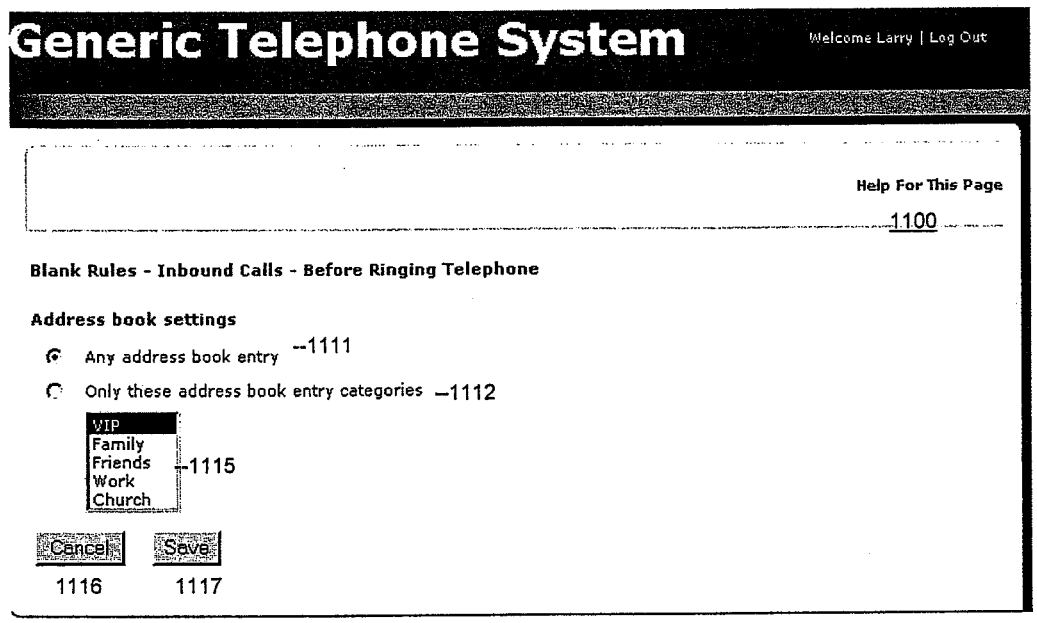
FIG. 11 is an exemplary Web page for setting address book entries, according to an aspect of the present invention.
Figure 12:
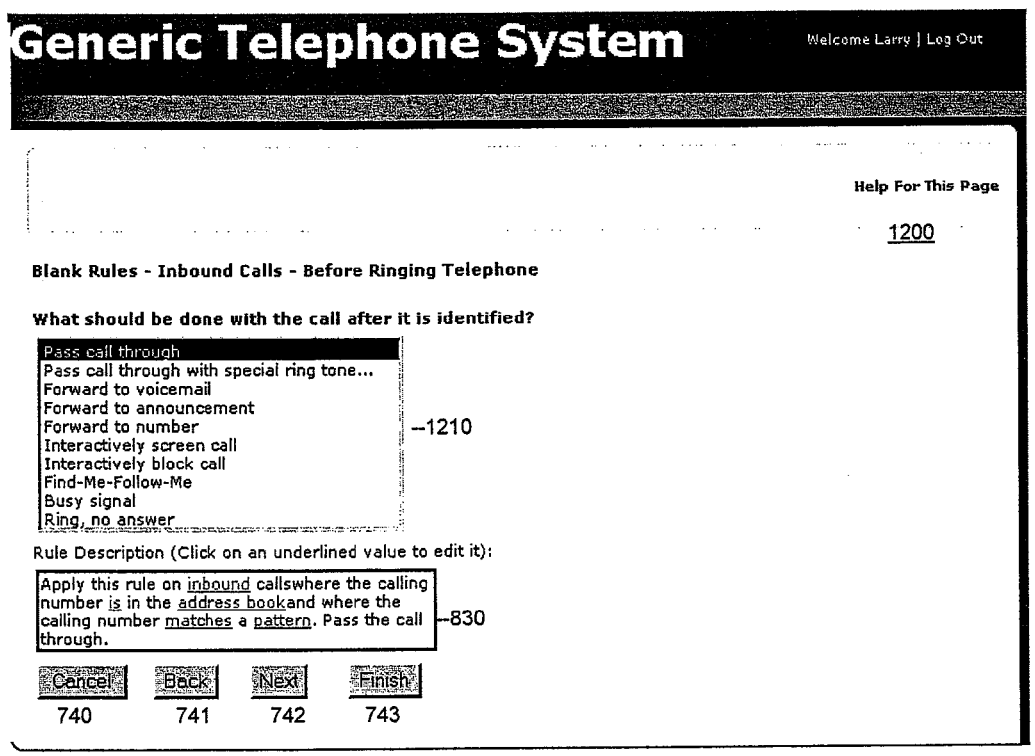
FIG. 12 is an exemplary Web page for identifying call dispositions, according to an aspect of the present invention.

FIG. 11 shows an exemplary web page 1100 which would be displayed, for example, when the subscriber clicks on "address book" in the Rule Description box 830 of FIG. 10. Web page 1100 enables the subscriber to specifically identify the address book that is to control application of the rule. In an embodiment of the invention, two address book settings are available. When the "Any address book entry" radio button 1111 is selected, then the rule is invoked whenever the calling number appears in any of the subscriber's previously entered address books. When the "Only these address book entry categories" radio button 1112 is selected, the subscriber may specify any number of specifically identified address books, which are listed in the Address Book box 1115. As shown, the VIP address book is highlighted, so that the rule would only applies when the calling number is listed in the VIP address book (when "Only these address book entry categories" has been selected). The subscriber is able to select multiple address books in this manner. When the subscriber has identified the appropriate address book application, he or she clicks on the Save button 1117 to implement the selection. The Cancel button 1116 cancels the selection, and sets the address book entry to the default, which may be the "Any address book entry" setting, for example. The various address books are created and edited by the subscriber, and are stored, for example, at the Rule Database 245, along with the customized call control rules.

Next, the subscriber must determine the disposition of the call once the circumstances under which the call control rule is to be applied have been fully identified. The subscriber selects the Next button 742, for example, from FIG. 10A or 10B, which results in web page 1200 being displayed at the web client 228. The web page 1200 reflects the same status of the rule being built, indicating "Blank Rules-Inbound Calls-Before Ringing Telephone." The web page 1200 also includes a Call Disposition box 1210, which lists the optional dispositions indicating what would be done with the call after it is identified. For example, the dispositions listed in the Call Disposition box 1210 are those that can be invoked for an inbound call before the phone rings, which may include the following examples:

Pass call through
Pass call through with special ring tone XXX
Forward to voicemail
Forward to system announcement
Forward to customer announcement XXX
Forward to number XXX
Interactively screen call
Interactively block call
Find-Me-Follow-Me
Busy signal
Ring, no answer Any of the various dispositions may be matched with the call identified by the selected rule building criteria, giving the subscriber tremendous flexibility in controlling calls. The subscriber selects the disposition that will apply to the incoming calls by clicking on them. The Call Disposition box 1210 shows that the subscriber has selected the "Pass call through with special ring tone" disposition, indicated by the highlighting. A corresponding description of this call disposition is therefore added to the Rule Description box 830, such as "Pass the call through. Ring with special ring-tone."

Figure 13:
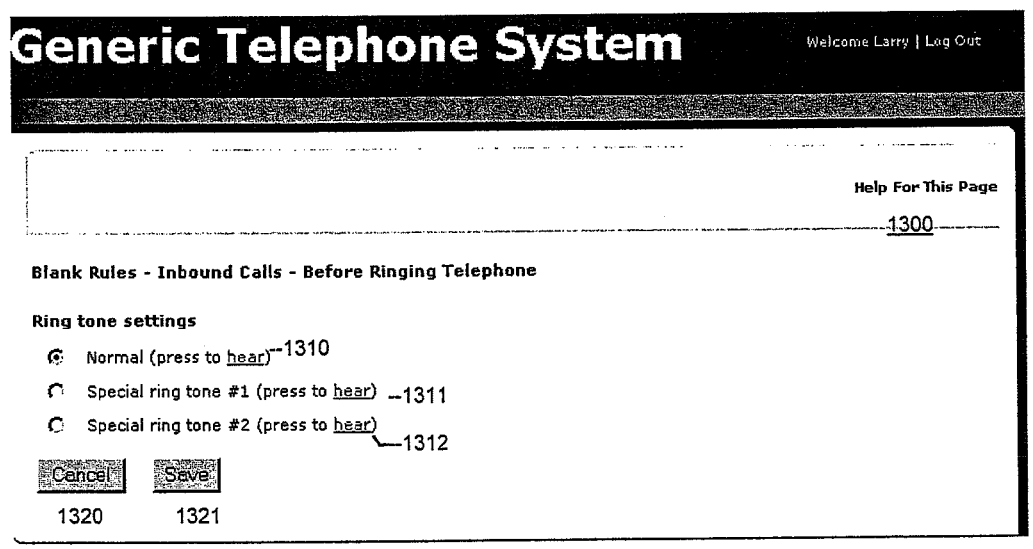
FIG. 13 is an exemplary Web page for setting ring tones, according to an aspect of the present invention.

In an embodiment of the invention, the subscriber is able to select the ring-tone by clicking on the underlined phrase "special ring-tone." This results in web page 1300 of FIG. 13 being displayed on the web client 228. The web page 1300 includes the various ring tone settings available to the subscriber. A normal ring tone is selected by clicking on the Normal radio button 1310, while special ring tones #1 and #2 are selected by clicking on the corresponding radio buttons 1311 and 1312. Each of the available ring tones includes a "press to hear" option that enables the subscriber to listen to the ring tone at the web client 228, for example, via a WAV audio file. In an embodiment of the invention, the subscriber can also create his or her own ring tones, for example, by importing desired audio files. Clicking the Cancel button 1320 negates any changes to the ring tone, and reverts to whatever ring tone is currently in place. For example, the normal ring tone is the default. Clicking the Save button 1321 saves the selected ring tone to be applied under the call control rule being built. The process then returns to web page 1200 of FIG. 12.

As the final step in creating the new call control rule, the subscriber must name the rule. FIG. 14 shows exemplary web page 1400, which requests the subscriber to specify a name for the rule in Name box 1410. Any name may be associated with the rule, although the subscriber should generally select a name indicative of the functionality of the call control rule so that the nature of the rule may be later ascertained based only on the name. However, in an embodiment of the invention, a default name is automatically generated from the information already supplied by the subscriber in building the rule. For example, the default name for the present rule, shown in Name box 1410, is "Special ring tone #1," which reflects the subscriber's choice of call disposition. The rule is activated by checking the "Turn on this rule" box 1411. Also, the subscriber may apply the rule to all telephone numbers associated with the subscriber's account by clicking on the "Create this rule on all phone numbers" box 1412. Otherwise, the rule is only applied to the telephone number originally shown in field 501 of web page 500 at the beginning of the process.

The subscriber has the opportunity to make additional modifications to the rule, for example, by clicking on Back button 741 or on the underlined phrases in the text of the Rule Description box 830. If the subscriber clicks the Cancel button 740, the rule criteria are discarded. By clicking the Finish box 743, the new rule is stored in the Rules Database 245 in association with the subscriber's account, and is ready for immediate implementation.

The web server 255 then again displays the main menu web screen 500 of FIG. 5 at the web client 228. In an embodiment of the invention, the new call control rule, "Special Ring tone #1," is added to the bottom of the rules listed in the Apply Rules box 510. To place the new rule elsewhere in the list, the subscriber clicks on the Move Up button 516 until the rule has the desired placement among the call control rules, which are sequentially execute from top to bottom, for example. The order is established by clicking on the OK button 522, and is accordingly stored for implementation in the Rules Database 245.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for implementing customized rules for controlling customer communications, comprising:

processing a request received from a remote source to customize a rule for controlling customer communications;

providing an entry menu for customizing rules for controlling customer communications based upon receipt of the request to customize a rule for controlling customer communications, the entry menu including a selectable option to modify an existing customized rule for controlling customer communications and a selectable option to create a new customized rule for controlling customer communications;

processing a request received via the entry menu to create a new customized rule for controlling customer communications;

providing, based upon receipt of the request to create a new customized rule for controlling customer communications, an initial selection criteria menu to create the new customized rule for controlling customer communications, the initial selection criteria menu indicating whether the new customized rule will be built using a preexisting template or starting from initial blank rule criteria;

processing a response received via the initial selection criteria menu indicating whether the new customized rule will be built using a preexisting template or starting from initial blank rule criteria;

determining from the response received via the initial selection criteria menu whether the new customized rule will be built using a preexisting template;

when the new customized rule will be built using a preexisting template, providing a list of preexisting templates for creating new customized rules for controlling customer communications, processing a received selection of a preexisting template from the list of preexisting templates, providing the selected preexisting template, accepting input to populate the selected preexisting template, and storing a new customized rule based on the selected preexisting template and including accepted input;

when the new customized rule will be built without using a preexisting template, providing initial blank rule criteria for creating a new customized rule for controlling customer communications, processing a received selection of initial criteria from the initial blank rule criteria, providing a list of rule conditions for the selected initial criteria for the new customized rule, processing a received selection of rule conditions for the selected initial criteria for the new customized rule, and creating and storing a new customized rule based on the selected initial criteria and the selected rule conditions;

providing a display describing the new customized rule; and processing communications in accordance with the stored new customized rule, wherein the stored new customized rule is implemented at an internal network node of a communications service provider in accordance with requests and selections received from customers using customer equipment, and wherein the stored new customized rule further includes a selected disposition for when the selected initial criteria and selected rule conditions are met.

2. The method according to claim 1,
wherein the communications processed in accordance with the stored new customized rule include internet voice communications.

3. The method according to claim 1,
wherein at least one rule condition specifies at least one entry in an electronic address book.

4. The method according to claim 1,
wherein at least one input to populate the selected preexisting template comprises an address book entry, and
wherein the address book entry is identified as belonging to one of a plurality of address book categories.

5. The method according to claim 1,
wherein the stored new customized rule results in a specified ring-tone being played when a rule condition is met.

6. The method according to claim 1,
wherein the stored new customized rule is specified to apply to inbound communications or outbound communications.

7. The method according to claim 1,
wherein the stored new customized rule is specified to apply before notifying a subscriber device at a subscriber destination address or after notifying a subscriber device at a subscriber destination address.

8. A system for implementing customized rules for controlling customer communications, comprising:
a web server that processes a request received from a remote source to customize a rule for controlling customer communications; provides an entry menu for customizing rules for controlling customer communications based upon receipt of the request to customize a rule for controlling customer communications, the entry menu including a selectable option to modify an existing customized rule for controlling customer communications and a selectable option to create a new customized rule for controlling customer communications; wherein the web server processes a request received via the entry menu to create a new customized rule for controlling customer communications; provides, based upon receipt of the request to create a new customized rule for controlling customer communications, an initial selection criteria menu to create the new customized rule for controlling customer communications, the initial selection criteria menu indicating whether the new customized rule will be built using a preexisting template or starting from initial blank rule criteria; wherein the web server processes a response received via the initial selection criteria menu indicating whether the new customized rule will be built using a preexisting template or starting from initial blank rule criteria, and determines from the response received via the initial selection criteria menu whether the new customized rule will be built using a preexisting template;
a storage that stores a new customized rule for controlling customer communications based on a selected preexisting template and including accepted input to populate the selected preexisting template when the selected preexisting template is selected from among a list of preexisting templates for creating new customized rules for controlling customer communications, the selection of the selected preexisting template from among the list of preexisting templates is received, the selected preexisting template is provided, the input to populate the selected preexisting template is accepted, and the new customized rule is built using the selected preexisting template and the accepted input,
wherein the storage stores a new customized rule for controlling customer communications based on selected initial criteria and selected rule conditions when initial blank rule criteria for creating a new customized rule for controlling customer communications are provided, a selection of initial criteria from the initial blank rule criteria is received, a list of rule conditions for the selected initial criteria is provided, a selection of rule conditions for the selected initial criteria is received, and the new customized rule is built using the selected initial criteria and selected rule conditions and without using a preexisting template,
wherein a display describes the new customized rule;
wherein communications are processed in accordance with the stored new customized rule,
wherein the stored new customized rule is implemented at an internal network node of a communications service provider in accordance with requests and selections received from customers using customer equipment, and
wherein the stored new customized rule further includes a selected disposition for when the selected initial criteria and selected rule conditions are met.

9. The system according to claim 8,
wherein the web server dynamically provides a description of the new customized rule.

10. The system according to claim 9,
wherein the description further defines the new customized rule.

11. The system according to claim 8,
wherein the web server communicates over the public Internet.

12. The system according to claim 8,
wherein the new customized rule controls telephone calls over the public switched telephone network.

13. The system according to claim 8,
wherein the new customized rule controls communications over the Internet.

14. A non-transitory computer-readable storage medium that stores a set of executable instructions for implementing customized rules for controlling customer communications, the set of executable instructions, when executed by a processor of a computer, causing the computer to perform acts including:
processing a request received from a remote source to customize a rule for controlling customer communications;
providing an entry menu for customizing rules for controlling customer communications based upon receipt of the request to customize a rule for controlling customer communications, the entry menu including a selectable option to modify an existing customized rule for controlling customer communications and a selectable option to create a new customized rule for controlling customer communications;
processing a request received via the entry menu to create a new customized rule for controlling customer communications;
providing, based upon receipt of the request to create a new customized rule for controlling customer communications, an initial selection criteria menu to create the new customized rule for controlling customer communications, the initial selection criteria menu indicating whether the new customized rule will be built using a preexisting template or starting from initial blank rule criteria;
processing a response received via the initial selection criteria menu indicating whether the new customized rule will be built using a preexisting template or starting from initial blank rule criteria;

determining from the response received via the initial selection criteria menu whether the new customized rule will be built using a preexisting template;

when the new customized rule will be built using a preexisting template, providing a list of preexisting templates for creating new customized rules for controlling customer communications, processing a received selection of a preexisting template from the list of preexisting templates, providing the selected preexisting template, accepting input to populate the selected preexisting template, and storing a new customized rule based on the selected preexisting template and including any accepted input;

when the new customized rule will be built without using a preexisting template, providing initial blank rule criteria for a new customized rule for controlling customer communications, processing a received selection of initial criteria from the initial blank rule criteria, providing a list of rule conditions for the selected initial criteria for the new customized rule, processing a received selection of rule conditions for the selected initial criteria for the new customized rule, and creating and storing a new customized rule based on the selected initial criteria and the selected rule conditions;

providing a display describing the new customized rule;

processing communications in accordance with the stored new customized rule, wherein the stored new customized rule is implemented at an internal network node of a communications service provider in accordance with requests and selections received from customers using customer equipment, and wherein the stored new customized rule further includes a selected disposition for when the selected initial criteria and selected rule conditions are met.

15. The storage medium according to claim 14, wherein a description of the new customized rule is provided via the display after processing the received selected initial criteria and selected rule conditions.

16. The method according to claim 1, further comprising:

overriding the stored new customized rule when an originator of a communication enters an override indicator and processing the communication in accordance with the override indicator.

17. The storage medium according to claim 14, wherein the stored new customized rule is associated with an override indicator such that an originator of a communication can enter the override indication to override the stored new customized rule.

* * * * *